United States Patent
Lu et al.

(10) Patent No.: US 11,540,369 B1
(45) Date of Patent: Dec. 27, 2022

(54) LIGHTING SYSTEM WITH COLOR TEMPERATURE ADJUSTMENT FUNCTION

(71) Applicant: Xiamen PVTECH Co., Ltd., Fujian (CN)

(72) Inventors: Fuxing Lu, Fujian (CN); Rongtu Liu, Fujian (CN)

(73) Assignee: Xiamen PVTECH Co., Ltd.

( * ) Notice: Subject to any disclaimer, the term of this patent is extended or adjusted under 35 U.S.C. 154(b) by 0 days.

(21) Appl. No.: 17/570,356

(22) Filed: Jan. 6, 2022

(30) Foreign Application Priority Data

Nov. 29, 2021 (CN) .......................... 202111435731.5

(51) Int. Cl.
*H05B 45/28* (2020.01)
*H05B 45/325* (2020.01)
*H05B 47/19* (2020.01)

(52) U.S. Cl.
CPC .......... *H05B 45/28* (2020.01); *H05B 45/325* (2020.01); *H05B 47/19* (2020.01)

(58) Field of Classification Search
None
See application file for complete search history.

(56) References Cited

U.S. PATENT DOCUMENTS

| | | | |
|---|---|---|---|
| 2011/0043133 A1* | 2/2011 | Van Laanen | H05B 45/10 363/84 |
| 2017/0231053 A1* | 8/2017 | Underwood | H02J 7/35 |
| 2019/0098723 A1* | 3/2019 | Sadwick | F21K 9/272 |

FOREIGN PATENT DOCUMENTS

CN 113329544 A * 8/2021

* cited by examiner

*Primary Examiner* — Dedei K Hammond
(74) *Attorney, Agent, or Firm* — Winston Hsu (57) ABSTRACT

A lighting system with color temperature adjustment function is provided, which includes a lighting device and a mobile temperature signal transmitting device. The lighting device includes a color temperature control module, a wireless signal receiving module and a plurality of light sources having different color temperatures. The mobile temperature signal transmitting device includes a wireless signal transmitting module and a temperature detecting module. The temperature detecting module detects an environmental temperature and transmits a temperature signal to the wireless signal receiving module via the wireless signal transmitting module for the color temperature control module to control the light sources. Thus, the color temperature of the lighting device can be related to the environmental temperature.

7 Claims, 5 Drawing Sheets

LIGHTING SYSTEM WITH COLOR TEMPERATURE ADJUSTMENT FUNCTION

BACKGROUND OF THE INVENTION

1. Field of the Invention

The present invention relates to a lighting system, in particular to a lighting system with color temperature adjustment function.

2. Description of the Prior Art

With advance of technology, the functions of light-emitting diode (LED) lighting devices also become stronger. However, the color temperatures of currently available LED lighting devices usually cannot be adjusted or can be adjusted only by special tools. Some currently available LED lighting devices have built-in temperature sensors, so the color temperatures of these LED lighting devices can be adjusted according to the temperatures detected by the built-in temperature sensors thereof. However, the temperatures detected by the built-in temperature sensors may be not necessarily close to the real temperature of the environment. Thus, the color temperatures of the LED lighting devices may still not match the real temperature of the environment.

SUMMARY OF THE INVENTION

The present invention is related to a lighting system with color temperature adjustment function. In one embodiment of the present invention, the lighting system with color temperature adjustment function includes a lighting device and a mobile temperature signal transmitting device. The lighting device includes a color temperature control module, a wireless signal receiving module and a plurality of light sources having different color temperatures. The mobile temperature signal transmitting device includes a wireless signal transmitting module and a temperature detecting module. The temperature detecting module detects an environmental temperature and transmits a temperature signal to the wireless signal receiving module via the wireless signal transmitting module for the color temperature control module to control the light sources. Thus, the color temperature of the lighting device can be related to the environmental temperature.

In one embodiment of the present invention, the lighting device further includes a light source driving module. The light source driving module drives the color temperature control module and the wireless signal receiving module.

In one embodiment of the present invention, the lighting device further includes a power source module. The power source module powers the wireless signal receiving module in order to drive the wireless signal receiving module after the power source module is driven by the light source driving module.

In one embodiment of the present invention, the light source driving module is connected to a power input end.

In one embodiment of the present invention, the mobile temperature signal transmitting device further includes a signal converting module. The signal converting module converts the temperature signal into a digital signal and transmits the digital signal to the wireless signal receiving module via the wireless signal transmitting module.

In one embodiment of the present invention, the mobile temperature signal transmitting device further includes a power supply module. The power supply module powers the signal converting module and the wireless signal transmitting module.

In one embodiment of the present invention, the lighting device further includes a signal processing module. The signal processing module converts the digital signal into a control signal, such that the color temperature control module controls the light sources according to the control signal in order to adjust the color temperature of the lighting device.

In one embodiment of the present invention, the control signal is a pulse-width modulation (PWM) signal.

In one embodiment of the present invention, the temperature detecting module may be a thermistor, a thermocouple or other similar elements.

In one embodiment of the present invention, the lighting device further includes a memory module. The memory module saves the setting data and the setting data includes a plurality of color temperature setting values corresponding to a plurality of temperature ranges.

The lighting system with color temperature adjustment function in accordance with the embodiments of the present invention may have the following advantages:

(1) In one embodiment of the present invention, the lighting system with color temperature adjustment function includes a mobile temperature signal transmitting device. The mobile temperature signal transmitting device can be disposed at a proper position so as to detect the environmental temperature and generate a temperature signal corresponding thereto. Therefore, the temperature signal can be certainly close to the real temperature of the environment. Then, the lighting device can adjust the color temperature thereof according to the temperature signal, such that the color temperature of the lighting device can match the real temperature of the environment.

(2) In one embodiment of the present invention, the mobile temperature signal transmitting device of the lighting system with color temperature adjustment function has a special circuit design, which can integrate a wireless signal transmitting module, a temperature detecting module and a signal converting module with each other. As a result, the mobile temperature signal transmitting device can effectively convert the temperature signal into a digital signal and transmit the digital signal to the lighting device. In this way, the temperature signal can be surely close to the real temperature of the environment.

(3) In one embodiment of the present invention, the lighting system with color temperature adjustment function can further include a memory module. Thus, the user can establish or adjust the setting data of the memory module in order to change the color temperature setting values corresponding to different environmental temperatures. Accordingly, the color temperature of the lighting device can conform to the personal requirements of the user.

(4) In one embodiment of the present invention, the lighting system with color temperature adjustment function can be applied to various types of buildings, so the lighting system can be comprehensive in application and more flexible in use.

(5) In one embodiment of the present invention, the design of the lighting system with color temperature adjustment function is simple and effective, so the lighting system can achieve the desired technical effects without significantly increasing the cost thereof. Therefore, the lighting system can have great commercial value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 1:
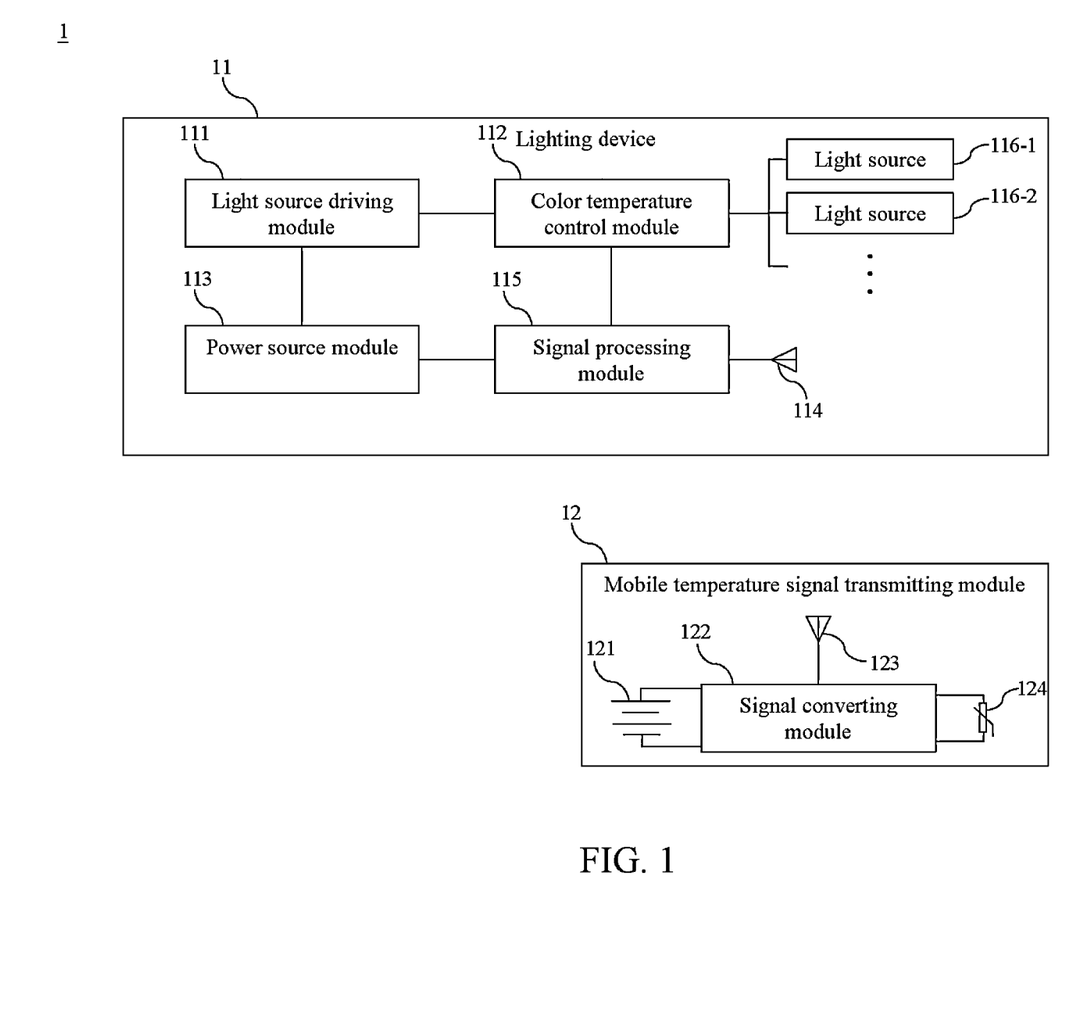
FIG. 1 is a block diagram of a lighting system with color temperature adjustment function in accordance with a first embodiment of the present invention.
Figure 2:
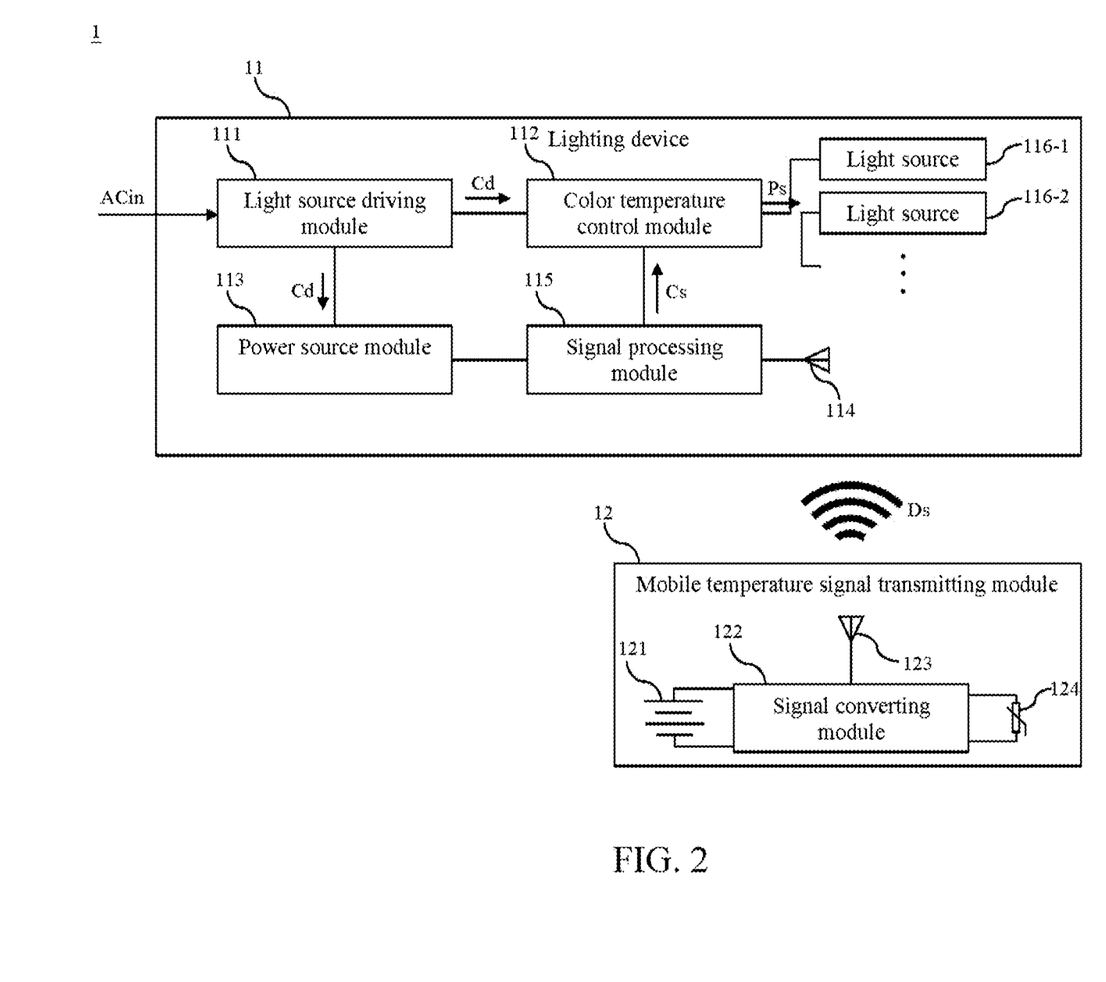
FIG. 2 is a schematic view of an operational state of the lighting system with color temperature adjustment function in accordance with the first embodiment of the present invention.

Please refer to FIG. 1 and FIG. 2. FIG. 1 is a block diagram of a lighting system with color temperature adjustment function in accordance with a first embodiment of the present invention. FIG. 2 is a schematic view of an operational state of the lighting system with color temperature adjustment function in accordance with a first embodiment of the present invention. As shown in FIG. 1, the lighting system 1 with color temperature adjustment function includes at least one lighting device 11 and at least one mobile temperature signal transmitting device 12.

The lighting device 11 includes a light source driving module 111, a color temperature control module 112, a power source module 113, a wireless signal receiving module 114, a signal processing module 115 and a plurality of light sources 116-1, 116-2 (FIG. 1 only shows two light sources 116-1, 116-2, but the lighting device 11 may include more than two light sources).

The light source driving module 111 is connected to the color temperature control module 112 and the power source module 113. In one embodiment, the light source driving module 111 may be light-emitting diode (LED) driver or other light source drivers. In one embodiment, the color temperature control module 112 may be a color temperature controller, a chip having a function circuit corresponding to the color temperature controller or other similar elements.

The signal processing module 115 is connected to the color temperature control module 112, the power source module 113 and the wireless signal receiving module 114. In one embodiment, the signal processing module 115 may be a chip having a signal converting circuit or other similar elements. In one embodiment, the wireless signal receiving module 114 may be an antenna or other similar elements.

The light sources 116-1, 116-2 are connected to the color temperature control module 112 and have different color temperatures. For instance, the light source 116-1 may be a light source having low color temperature and the light source 116-2 may be a light source having high color temperature. In one embodiment, the light sources 116-1, 116-2 may be LEDs, fluorescent lamps, bulbs or other similar elements.

The mobile temperature signal transmitting device 12 includes a power supply module 121, a signal converting module 122, a wireless signal transmitting module 123 and a temperature detecting module 124. The signal converting module 122 is connected to the power supply module 121 and the wireless signal transmitting module 123. In one embodiment, the signal converting module 122 may be a chip having a signal converting circuit or other similar elements. In one embodiment, the power supply module 121 may be a battery, an external power source or other similar elements. In one embodiment, the wireless signal transmitting module 123 may be an antenna or other similar elements. In one embodiment, the temperature detecting module 124 may be a thermistor, a thermocouple or other elements having temperature detecting function.

The temperature detecting module 124 detects the environmental temperature and transmits a temperature signal Ts to the wireless signal receiving module 114 via the wireless signal transmitting module 123 for the color temperature control module 112 to control the light sources 116-1, 116-2. Therefore, the color temperature of the lighting device 11 can be related to the environmental temperature. The following content illustrates the details of the operational mechanism of the lighting system 1 with color temperature adjustment function.

Regarding the lighting device 11 shown in FIG. 2, the light source driving module 111 is connected to a power input end (not shown in the drawings) and receives the power input signal ACin from the power input end. Therefore, the light source driving module 111 can be powered by the power input end (e.g., the power input end may be the utility power). Afterward, the light source driving module 111 outputs a driving signal Cd (e.g., a constant-current signal or a constant-voltage signal) to drive the color temperature control module 112 and the power source module 113. After that, the power source module 113 powers the wireless signal receiving module 114 and the signal processing module 115 so as to drive the wireless signal receiving module 114 and the signal processing module 115.

Regarding the mobile temperature signal transmitting device 12 shown in FIG. 2, the power supply module 121 powers the signal converting module 122 and the wireless signal transmitting module 123 in order to drive the signal converting module 122 and the wireless signal transmitting module 123. The temperature detecting module 123 detects the environmental temperature to generate an analog temperature signal Ts. Then, the signal converting module 122 converts the temperature signal Ts into a digital signal Ds and transmits the digital signal Ds to the wireless signal receiving module 14 of the lighting device 11 via the wireless signal transmitting module 123.

Finally, the signal processing module 115 of the lighting device 11 receives the digital signal Ds via the wireless signal receiving module 114 and converts the digital signal Ds into a control signal Cs. In this way, the color temperature control module 112 can generate a color temperature adjustment signal Ps according to the control signal Cs in order to control the light sources 116-1, 116-2. In one embodiment, the control signal Cs may be a pulse-width modulation (PWM signal) signal or other similar signals. The color temperature control module 112 can generate the color temperature adjustment signal Ps according to the control signal Cs so as to turn on one of the light sources 116-1, 116-2 or turn on all light sources 116-1, 116-2 at the same time. Accordingly, the lighting device 11 can have several color temperatures. The lighting device 11 can also have three or more than three light sources, such that the lighting device 11 can have more color temperatures.

The mobile temperature signal transmitting device 12 can be disposed at a proper position of a building so as to detect the environmental temperature and then generate the temperature signal Ts corresponding thereto. Accordingly, the temperature signal Ts can be certainly close to the real temperature of the environment. For instance, the mobile temperature signal transmitting device 12 may be disposed at the position around the window inside a room, such that the temperature signal Ts detected by the mobile temperature signal transmitting device 12 can be surely close to the temperature of the room. As a result, the lighting device 11 can adjust the color temperature thereof according to the temperature signal Ts with a view to make the color temperature of the lighting device 11 match the real temperature of the room. In this way, the color temperature control module 112 can adjust the light sources 116-1, 116-2 to make the color temperature of the lighting device 11 be cold (high color temperature). On the contrary, the color temperature control module 112 can adjust the light sources 116-1, 116-2 to make the color temperature of the lighting device 11 be warm (low color temperature). Therefore, the user can feel more comfortable because the color temperature of the lighting device 11 is appropriate.

As set forth above, the lighting system 1 with color temperature adjustment function has the mobile temperature signal transmitting device 12, which can be disposed at a proper position so as to detect the environmental temperature and generate a temperature signal Ts corresponding thereto. Therefore, the temperature signal Ts can be certainly close to the real temperature of the environment. Then, the lighting device 11 can adjust the color temperature thereof according to the temperature signal Ts, such that the color temperature of the lighting device 11 can match the real temperature of the environment.

In addition, the mobile temperature signal transmitting device 12 of the lighting system 1 with color temperature adjustment function has a special circuit design, which can integrate the wireless signal transmitting module 123, the temperature detecting module 124 and the signal converting module 122 with each other. Accordingly, the mobile temperature signal transmitting device 12 can effectively convert the temperature signal Ts into the digital signal Ds and transmit the digital signal Ds to the lighting device 11. Thus, the temperature signal Ts can be certainly close to the real temperature of the environment.

Figure 3:
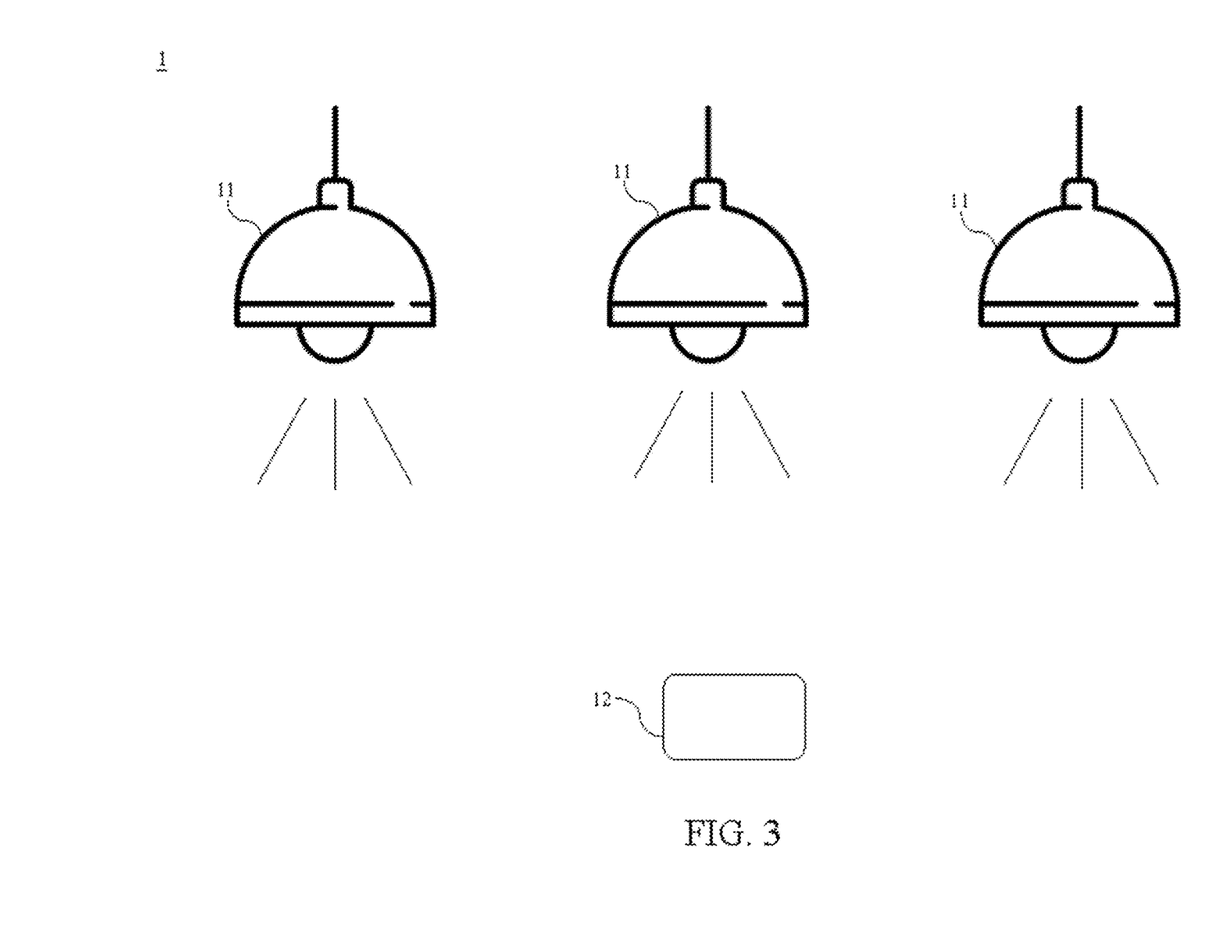
FIG. 3 is a first schematic view of the lighting system with color temperature adjustment function in accordance with the first embodiment of the present invention.
Figure 4:
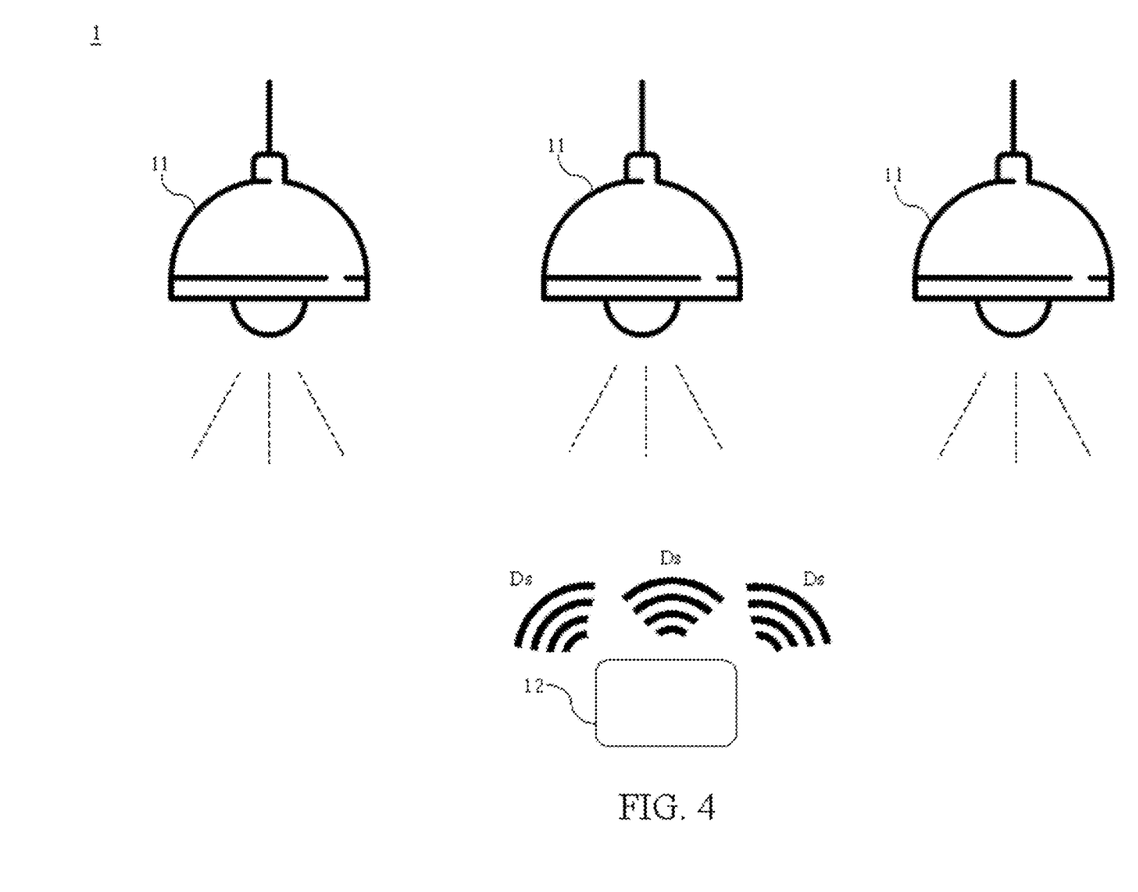
FIG. 4 is a second schematic view of the lighting system with color temperature adjustment function in accordance with the first embodiment of the present invention.

Please refer to FIG. 3 and FIG. 4, which are a first schematic view and a second schematic view of the lighting system with color temperature adjustment function in accordance with the first embodiment of the present invention. As shown in FIG. 3, several lighting devices 11 can be corresponding to one mobile temperature signal transmitting device 12.

As shown in FIG. 4, when the mobile temperature signal transmitting device 12 detects the environmental temperature to generate the temperature signal Ts, the mobile temperature signal transmitting device 12 converts the temperature signal Ts into the digital signal Ds and transmits the digital signal Ds to the lighting devices 11. Afterward, the lighting devices 11 perform signal conversion according to the digital signal Ds in order to adjust the color temperature thereof.

The embodiment just exemplifies the present invention and is not intended to limit the scope of the present invention; any equivalent modification and variation according to the spirit of the present invention is to be also included within the scope of the following claims and their equivalents.

It is worthy to point out that currently available LED lighting devices have built-in temperature sensors, so the color temperatures of these LED lighting devices can be adjusted according to the temperatures detected by the built-in temperature sensors thereof. However, the temperatures detected by the built-in temperature sensors may be not necessarily close to the real temperature of the environment. Thus, the color temperatures of the LED lighting devices may still not match the real temperature of the environment. On the contrary, according to one embodiment of the present invention, the lighting system with color temperature adjustment function includes a mobile temperature signal transmitting device. The mobile temperature signal transmitting device can be disposed at a proper position so as to detect the environmental temperature and generate a temperature signal corresponding thereto. Therefore, the temperature signal can be surely close to the real temperature of the environment. Then, the lighting device can adjust the color temperature thereof according to the temperature signal, such that the color temperature of the lighting device can match the real temperature of the environment.

Also, according to one embodiment of the present invention, the mobile temperature signal transmitting device of the lighting system with color temperature adjustment function has a special circuit design, which can integrate a wireless signal transmitting module, a temperature detecting module and a signal converting module with each other. As a result, the mobile temperature signal transmitting device can effectively convert the temperature signal into a digital signal and transmit the digital signal to the lighting device. In this way, the temperature signal can be certainly close to the real temperature of the environment.

Further, according to one embodiment of the present invention, the lighting system with color temperature adjustment function can further include a memory module. Thus, the user can establish or adjust the setting data of the memory module in order to change the color temperature setting values corresponding to different environmental temperatures. Accordingly, the color temperature of the lighting device can conform to the personal requirements of the user.

Moreover, according to one embodiment of the present invention, the lighting system with color temperature adjustment function can be applied to various types of buildings, so the lighting system can be comprehensive in application and more flexible in use.

Furthermore, according to one embodiment of the present invention, the design of the lighting system with color temperature adjustment function is simple and effective, so the lighting system can achieve the desired technical effects without significantly increasing the cost thereof. Therefore, the lighting system can have great commercial value.

Figure 5:
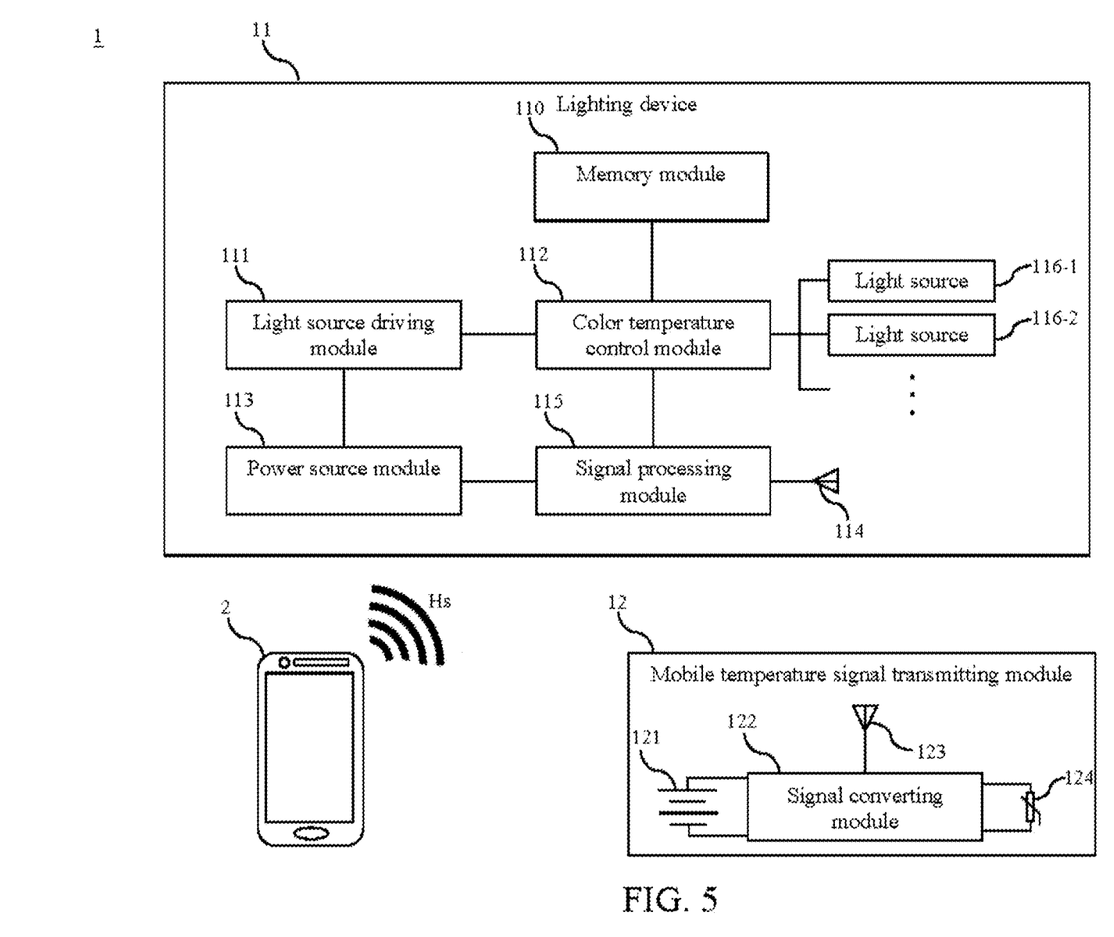
FIG. 5 is a block diagram of a lighting system with color temperature adjustment function in accordance with a second embodiment of the present invention.

Please refer to FIG. 5, which is a block diagram of a lighting system with color temperature adjustment function in accordance with a second embodiment of the present invention. As shown in FIG. 5, the lighting system 1 with color temperature adjustment function includes at least one lighting device 11 and at least one mobile temperature signal transmitting device 12.

The lighting device 11 includes a light source driving module 111, a color temperature control module 112, a power source module 113, a wireless signal receiving module 114, a signal processing module 115 and a plurality of light sources 116-1, 116-2 (FIG. 1 only shows two light sources 116-1, 116-2, but the lighting device 11 may include more than two light sources).

The mobile temperature signal transmitting device 12 includes a power supply module 121, a signal converting module 122, a wireless signal transmitting module 123 and a temperature detecting module 124.

The above elements are similar to those of the previous embodiment, so will not be described herein. The difference between this embodiment and the previous embodiment is that the lighting device 11 of this embodiment further includes a memory module 110. The memory module 110 is connected to the color temperature control module 112 and saves the setting data. The setting data includes a plurality of color temperature setting values corresponding to a plurality of temperature ranges. The user can transmit a setting signal Hs to the memory module 110 so as to adjust the setting data via a mobile device 2 (e.g., smart phone, tablet computer, laptop computer, etc.) or via a remote management platform. Accordingly, the user can establish or adjust the setting data of the memory module in order to change the color temperature setting values corresponding to different environmental temperatures. In this way, the color temperature of the lighting device 11 can conform to the personal requirements of the user.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting system with color temperature adjustment function includes a mobile temperature signal transmitting device. The mobile temperature signal transmitting device can be disposed at a proper position so as to detect the environmental temperature and generate a temperature signal corresponding thereto. Therefore, the temperature signal can be surely close to the real temperature of the environment. Then, the lighting device can adjust the color temperature thereof according to the temperature signal, such that the color temperature of the lighting device can match the real temperature of the environment.

Also, according to one embodiment of the present invention, the mobile temperature signal transmitting device of the lighting system with color temperature adjustment function has a special circuit design, which can integrate a wireless signal transmitting module, a temperature detecting module and a signal converting module with each other. As a result, the mobile temperature signal transmitting device can effectively convert the temperature signal into a digital signal and transmit the digital signal to the lighting device. In this way, the temperature signal can be certainly close to the real temperature of the environment.

Further, according to one embodiment of the present invention, the lighting system with color temperature adjustment function can further include a memory module. Thus, the user can establish or adjust the setting data of the memory module in order to change the color temperature setting values corresponding to different environmental temperatures. Accordingly, the color temperature of the lighting device can conform to the personal requirements of the user.

Moreover, according to one embodiment of the present invention, the lighting system with color temperature adjustment function can be applied to various types of buildings, so the lighting system can be comprehensive in application and more flexible in use.

Furthermore, according to one embodiment of the present invention, the design of the lighting system with color temperature adjustment function is simple and effective, so the lighting system can achieve the desired technical effects without significantly increasing the cost thereof. Therefore, the lighting system can have great commercial value.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting system with color temperature adjustment function, comprising:
   a lighting device, comprising a color temperature control module, a wireless signal receiving module and a plurality of light sources having different color temperatures;
   a mobile temperature signal transmitting device, comprising a wireless signal transmitting module, a temperature detecting module and a signal converting module; and
   a signal processing module;
   wherein the temperature detecting module is configured to detect an environmental temperature to obtain a temperature signal, and the signal converting module is configured to convert the temperature signal into a digital signal and transmit the digital signal to the wireless signal receiving module via the wireless signal transmitting module, wherein the signal processing module is configured to convert the digital signal into a control signal, whereby the color temperature control module controls the light sources according to the control signal in order to adjust the color temperature of the lighting device, wherein the control signal is a pulse-width modulation signal.

2. The lighting system with color temperature adjustment function as claimed in claim 1, wherein the lighting device further comprises a light source driving module configured to drive the color temperature control module and the wireless signal receiving module.

3. The lighting system with color temperature adjustment function as claimed in claim 2, wherein the lighting device further comprises a power source module configured to power the wireless signal receiving module in order to drive the wireless signal receiving module after the power source module is driven by the light source driving module.

4. The lighting system with color temperature adjustment function as claimed in claim 2, wherein the light source driving module is connected to a power input end.

5. The lighting system with color temperature adjustment function as claimed in claim 1, wherein the mobile temperature signal transmitting device further comprising a power supply module configured to power the signal converting module and the wireless signal transmitting module.

6. The lighting system with color temperature adjustment function as claimed in claim 1, wherein the temperature detecting module is a thermistor or a thermocouple.

7. The lighting system with color temperature adjustment function as claimed in claim 1, wherein the lighting device further comprises a memory module configured to save a setting data and the setting data comprises a plurality of color temperature setting values corresponding to a plurality of temperature ranges.

\* \* \* \* \*